May 12, 1959   J. Z. DE LOREAN   2,885,908
TRANSMISSION
Filed Nov. 16, 1955

INVENTOR.
John Z. De Lorean

2,885,908

TRANSMISSION

John Z. De Lorean, Detroit, Mich., assignor to Studebaker-Packard Corporation, Detroit, Mich., a corporation of Michigan Application November 16, 1955, Serial No. 547,179

7 Claims. (Cl. 74—677)

This invention relates to automatic variable speed transmissions and more particularly it relates to a variable speed transmission system for motor vehicles, including a series of torque converters of different capacity, operating in conjunction with a planetary gear arrangement.

One of the principal features of this new transmission arrangement is that it substantially eliminates the need for complicated controls to control its operation in response to variations of engine torque and vehicle speed. In this connection, it will be appreciated that the present types of transmissions commonly utilized in modern motor vehicles, require the use of extremely complicated hydraulic control systems. In principle, these controls are adapted to balance engine torque output against the vehicle speed in order to selectively engage one of several gear ranges provided in the transmission gear system. From experience it has been proven that these old transmission designs are relatively inefficient in their operation, are expensive to manufacture and operate, and also are difficult to maintain in proper working order.

The applicant's new transmission is specifically designed to overcome these problems, and in addition to being considerably less expensive to manufacture and comparatively simple to operate, it also results in a substantial saving of space and weight.

For a better understanding of the present invention, reference may be had to the accompanying drawings in which.

Figure 1:
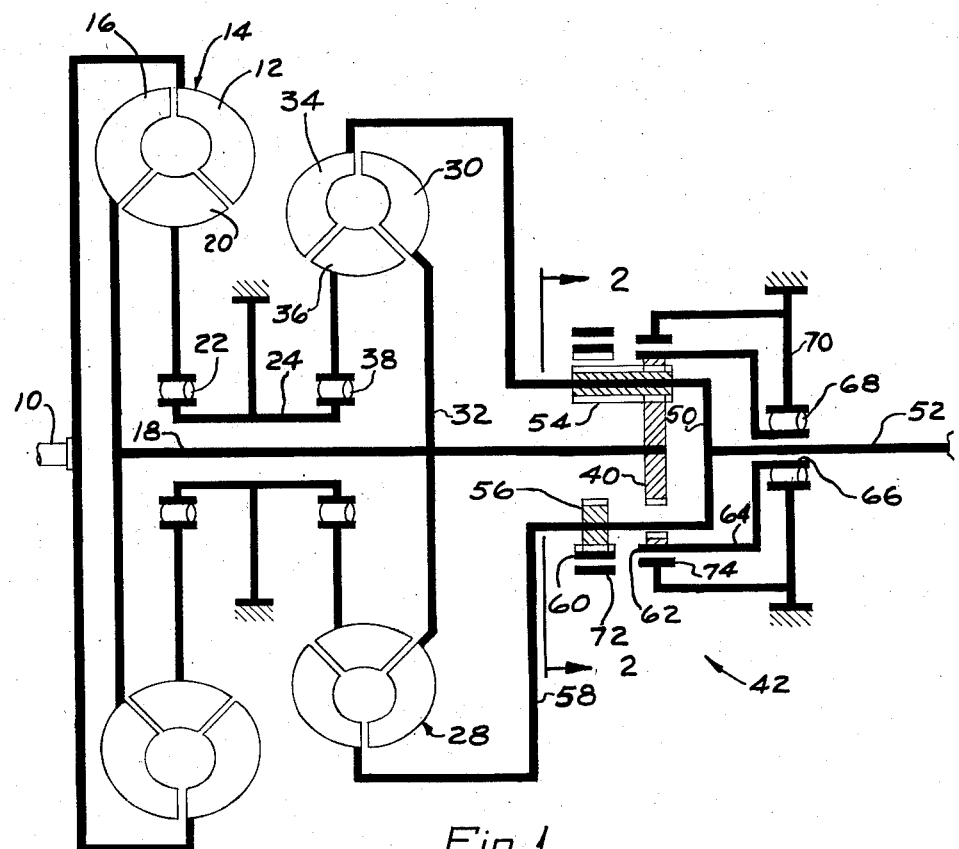
Figure 1 is a schematic side view of the applicant's new transmission.

With reference to the drawing, it will be seen that a drive shaft 10 is drivingly connected with an impeller member 12 of a conventional torque converter 14. The converter 14 has a turbine member 16 connected near the forward end of an intermediate shaft 18, which is axially aligned with the drive shaft 10. The converter 14 also includes a reactor member 20 connecting with a one-way clutch 22, mounted on a sleeve 24 which is fixedly supported about the intermediate shaft 18. The one-way clutch mechanism 22 may be of any conventional design and, as is well known to those skilled in the art, serves to prevent the reactor member 20 from rotating in the reverse direction with respect to the impeller member 12.

As will also be seen in the drawing, the applicant's new transmission includes a second converter 28 of smaller torque output capacity than converter 14 but otherwise of similar design. The converter 28 includes an impeller member 30, which is driven by the intermediate shaft 18 through connecting element 32. The small converter 28 also includes a turbine member 34 and a reactor member 36, and the latter is connected through a one-way clutch mechanism 38, with the sleeve member 24.

A sun gear 40 fixedly mounted on the rearward end of the intermediate shaft 18, serves to drive a planetary gear system indicated generally at 42. The planetary gear system 42 is generally of conventional design, except for certain adaptations which are pointed out below. A detailed description of a similar planetary arrangement is disclosed in McFarland Patent No. 2,694,948, issued November 23, 1954.

Figure 2:
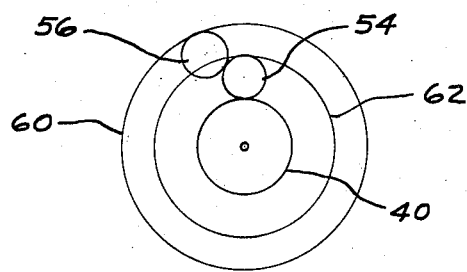
Figure 2 is a partially schematic view in section taken along lines 2—2 of Figure 1.

The planetary gear system includes a carrier member 50 which is fixedly mounted on a driven shaft 52; the latter being disposed substantially in axial alignment with the intermediate and drive shafts. The carrier member 50 rotatably supports a long pinion gear 54 which meshes with the sun gear 40 and also rotatably supports a short pinion gear 56. As illustrated in Figure 2, the short pinion gear 56 meshes with pinion 54, though for the purpose of simplifying the drawing, though, they are not shown as meshed in Figure 1. Also, it will be appreciated that although only a single short and long pinion gear is shown in the drawings, additional gears in each set of pinions may be utilized, if desired, as will be apparent to those skilled in the art. The turbine member 34 of the small converter 28 is drivingly connected with the carrier member 50 by connecting element 58, and thus, when the turbine 34 of the small converter is driven, the carrier member 50 and the driven shaft 52 are driven thereby.

An internally toothed ring gear 60 is concentrically disposed about carrier member 50, and meshes with the short pinion gear 56. A second internally toothed ring gear 62 is also concentrically disposed about carrier member 50 and meshes with the long pinion gear 54. The second ring gear 62 has a collar member 64 formed integrally about its periphery, and the latter is supported by a hub member 66 which in turn is rotatably supported about the forward end of the driven shaft 52. A one-way clutch mechanism 68 connecting with a fixed element 70 of the transmission housing, engages the hub member 66 and serves to hold the second ring gear 62 against rotation in one direction.

Selectively operable reverse and forward drive brake means 72 and 74, are associated with each of the ring gears 60 and 62, respectively, and operate to hold the ring gears against rotation. The brakes 72 and 74 may be operated by direct mechanical linkage connecting with the conventional gear selector lever, in a manner apparent to those skilled in the art. Also, other means such as hydraulically operated pressure motors, for example, may be used for this purpose. The operation and function of brakes 72 and 74 will subsequently be described in detail.

When the drive shaft 10 is rotated, the impeller member 12 of the large converter 14 is rotated therewith, and its impeller member 12 drives the turbine member 16, which in turn drives the intermediate shaft 18 and sun gear 40, and also the impeller member 30 of the small converter 28. When the engine torque output has increased sufficiently, the impeller 30 of the small converter 28 commences to drive its associated turbine 34, which in turn drives the carrier member 50 and driven shaft 52.

In this connection, it will be appreciated that at relatively low speeds and low engine torque output, little or no torque is transmitted to the carrier member and driven shaft 52 through the small converter 28, due to the latter's relatively small capacity. However, as the engine torque is increased, the small converter 28 delivers a proportionately increased amount of torque to the driving shaft 52 until it reaches its theoretical coupling point. The proportion of torque output of the two converters is, of course, dependent upon their relative capacities; for example, a ratio of 8 to 12 has been found to be a satisfactory relationship between the capacities of the two converters. It is to be understood, however, that this particular relationship of the converters is given only for purposes of illustration, and that the applicant's transmission system is not to be considered as limited thereby.

The following is a description of the operation of the applicant's new transmission system:

To obtain a forward driving speed, reverse brake band 72 is released, and the forward brake band 74 is operated to hold ring gear 62 against rotation. When the intermediate shaft 18 and sun gear 40 are driven at low speeds, the long pinion gear 54 and the short pinion gear 56 are rotatably driven thereby. Thus, the long pinion gear 54 is caused to walk about the ring gear 62, and as a result the carrier member is rotated with the long pinion gear 54, driving output shaft 52, in what is the equivalent of low range drive.

As the engine torque output increases, and the small converter 28 becomes operative, and the turbine member 34 thereof causes the carrier member to rotate in the same direction, with the result that an increased torque is imparted to the driven shaft 52. Thus, it will be seen that this new transmission is shiftless in its operation, and also it is automatically torque and speed responsive without necessitating the use of complicated hydraulic controls conventionally used in the present types of transmission arrangements.

Another important feature of the applicant's transmission is that it provides a simplified kick-down arrangement for supplying an immediate increase in power for increased acceleration at higher speeds, which does not require additional gears and controls, as is frequently the case in the conventional types of transmissions. In this connection it will be seen that while driving at normal speeds (where both converters are operating as fluid couplings with no torque multiplication), if the operator requires a sudden increase in power, he simply has to depress the accelerator pedal to an increased throttle position. Due to the increased torque transmitted from the engine, the small converter 28 no longer functions as a fluid coupling, since the impeller member 30 is then rotated at an increased rate of speed with respect to the turbine member 34. As a result, an increase in torque is transmitted to the planetary gear set and drive shaft 52 by virtue of the torque multiplication derived through the small converter 28. The large converter 14 normally continues to operate at its theoretical coupling point throughout the kick-down operation, due to its greater capacity, particularly at higher vehicle speeds. It is possible however, to obtain increased torque multiplication through both converters at relatively low speeds when the engine accelerator is rapidly opened, due to the higher increment of engine torque output then available.

To condition the transmission to operate in reverse drive, the reverse band 72 is made operative to hold the ring gear 60 against rotation and the forward brake band 74 is released. Thus, as the sun gear 40 is driven, the short pinion gear 56 is walked around the held ring gear 60 in a reverse direction, thereby driving the carrier and driven shaft 52 in a reverse direction. The ring gear 62 is held against rotation in the reverse direction, due to the reaction force exerted by the rotating long pinion 54, by the one-way clutch 68.

In this connection, it will be noted that when in reverse drive the turbine member 34 of the small converter 28 (which drivingly coupled with the carrier 50), is also caused to rotate in a reverse direction in respect to its associated impeller member 30. The resulting inefficient operation of the reverse drive, however, is comparatively insignificant due to the fact that at low reverse speeds very little, if any, torque is transmitted through the small converter 28. In addition, the disadvantage of this reverse drive is largely outweighed by the increased efficiency and smoothness of operation of the forward drive arrangement, and also by the elimination for the need for costly and complicated transmission controls.

As previously explained, the brakes 72 and 74 may be operated in various ways apparent to those skilled in the art, but the significant point in this respect is that a simple mechanical or hydraulic arrangement may be utilized for this purpose, controlled by the movement of conventional selector lever, and a complicated hydraulic control system, as used in conjunction with present type transmissions, is not required.

It is to be understood that this invention is capable of other embodiments than that disclosed herein. For example, it is to be understood that the specific form of the planetary gear arrangement described above is only for the purpose of illustration of the invention, and that this transmission arrangement can be adapted to operate satisfactorily with other types of transmission gear systems, or other apparent modifications of the planetary gear systems. Accordingly, it is to be understood the following claims are not to be limited to the terminology used in the specifications or to the specific embodiment of the invention described above.

I claim:

1. A transmission comprising a planetary gear system including a carrier, two sets of meshing pinion gears rotatably supported by said carrier, and a sun gear meshing with one of the sets of pinion gears, a drive shaft, an intermediate shaft fixedly mounting the sun gear, a driven shaft connecting with the carrier, a pair of torque converters of different torque output capacities, each having impeller and turbine members, means for drivingly connecting the drive shaft with the impeller member of one converter, means for drivingly connecting the turbine member of said one converter with the intermediate shaft, means for drivingly connecting the intermediate shaft with the impeller member of the other converter, means for drivingly connecting the turbine member of said other converter with the driven shaft, two internally toothed ring gears meshing with each set of pinion gears, respectively, means for holding one of the ring gears against rotation in one direction, and selectively operable means for holding one of the ring gears against rotation while its associated pinion gear is walked around the held ring gear as the sun gear is driven, whereby the driven shaft may be selectively rotated in opposite directions.

2. A transmission comprising a planetary gear system including a rotatable carrier member rotatably supporting meshing long and short pinion gears, a driven shaft drivingly connected to said carrier member, a drive shaft, and intermediate shaft, a sun gear fixedly mounted on said intermediate shaft and meshing with at least one of the pinion gears, a pair of torque converters of different torque output capacities each including impeller, turbine and reactor members, means for drivingly connecting the drive shaft with the impeller member of one converter, means for drivingly connecting the turbine member of said one converter with the intermediate shaft, means for drivingly connecting the intermediate shaft with the impeller member of the other converter, a fixedly mounted sleeve member disposed about said intermediate member between said last two mentioned means, one-way brake means connecting the reactor members of each converter with said sleeve member, means for drivingly connecting the carrier member with the turbine member of said other converter, two ring gears meshing with the long and short pinion gears, respectively, and selectively operable means for holding said ring gears in fixed position with respect to their associated pinion gears.

3. A transmission comprising a planetary gear system including a rotatable carrier member rotatably supporting meshing long and short pinion gears, a driven shaft connected to said carrier member, a drive shaft, an intermediate shaft, a sun gear connected to said intermediate shaft and meshing with the long pinion gear, a pair of torque converters of different output capacities, each including impeller turbine and reactor members, means for drivingly connecting the drive shaft with the impeller member of one converter, means for drivingly connecting the turbine member of said one converter with the intermediate shaft, means for drivingly connecting the intermediate shaft with the impeller member of the other converter, a fixedly mounted sleeve member disposed about said intermediate member between the last two mentioned means, one-way brake means connecting the reactor members of each converter with said sleeve member, means for drivingly connecting the carrier member with the turbine member of said other converter, two ring gears meshing with the long and short pinion gears, respectively, brake means for holding the ring gear associated with the long pinion gear against rotation in one direction and selectively operable means to hold said ring gears in a fixed position with respect to their associated pinion gears.

4. A transmission comprising a planetary gear system including a rotatably mounted carrier member rotatably supporting meshing long and short pinion gears, a driven shaft connected to said carrier member, a drive shaft, an intermediate shaft, a sun gear connected to said intermediate shaft and meshing with the long pinion gear, a pair of torque converters of different torque output capacities each including impeller, turbine and reactor members, means for drivingly connecting the drive shaft with the impeller member of the converter of larger capcaity, means for drivingly connecting the turbine member of said last mentioned converter with the intermediate shaft, means for drivingly connecting the intermediate shaft with the impeller member of the other converter, means for drivingly connecting the carrier member with the turbine member of said other converter, a fixedly mounted sleeve member disposed about said intermediate shaft, one-way brake means connecting the reactor member of each converter with said sleeve member, two ring gears engaging the long and short pinion gears, respectively, means for holding the ring gear meshing with the long pinion gear against rotation in one direction, selectively operable means for holding one of the ring gears against rotation so that the associated pinion gear is walked around said held ring gear when the sun gear is driven, whereby the driven shaft may be selectively rotated in opposite directions.

5. A vehicle transmission comprising a planetary gear system including a carrier member which rotatably supports meshing long and short pinion gears, a driven shaft connected with said carrier member, a drive shaft, an intermediate shaft, a sun gear fixedly mounted on the intermediate shaft and meshing with the long pinion gear, a first converter including impeller, turbine and reactor members, means connecting with the drive shaft for driving the impeller member, means connecting with the turbine member for driving the intermediate shaft, a fixedly mounted sleeve member disposed about the intermediate shaft, means connecting with the reactor member and the sleeve member to maintain the former against rotation in one direction, a second converter of smaller torque output capacity, including impeller, turbine and reactor members, means connecting with the intermediate shaft to drive the impeller member of the second converter, means connecting with the turbine member of said second converter to drive the driven shaft, means connecting with the reactor member of the second converter and the sleeve member to prevent the rotation of the former in one direction, a first internally toothed ring gear meshing with the short pinion gear, a second internally toothed ring gear meshing with the long pinion gear, means to hold said second ring gear against rotation in one direction, and alternately operable means to hold one of said ring gears against rotation, while the other ring gear is free to rotate, whereby, as the sun gear is driven and the first ring gear is held, the short pinion gear is walked around the first ring gear driving the carrier in the same direction as the sun gear, and when the second ring gear is held the long pinion gear is walked around the second ring gear, driving the carrier in a reverse direction.

6. A transmission comprising drive, intermediate and driven members, a torque multiplying gear system comprising sun gear means connected to said intermediate member, a ring gear, planet gears in mesh with said sun gear means and said ring gear, planet carrier means for said planet gears drivingly connected to said driven member, selectively operable brake means for holding said ring gear against rotation for forward drive, a first converter having impeller and turbine elements connecting with the drive and intermediate members respectively, and a second converter of lower torque capacity having impeller and turbine elements connecting with said intermediate member and said planet carrier means respectively.

7. A transmission comprising drive, intermediate and driven members, a torque multiplying gear system comprising sun gear means, fixedly connected to said intermediate member, first and second ring gears which are rotatable relative to each other, selectively operable brake means for optionally holding said first and second ring gears against rotation for forward drive and reverse drive respectively, a first set of planet gears in mesh with said sun gear means and said first ring gear, a second set of planet gears in mesh with said first set of planet gears and said second ring gear, planet carrier means connected to driven member and being connected to said sets of planet gears for rotating said sets of planet gears in union about the axis of said sun gear means, a first converter having impeller and turbine elements connecting with the drive and intermediate members respectively, and a second converter of lower torque capacity having impeller and turbine elements connecting with the intermediate member and said planet carrier means respectively.

References Cited in the file of this patent
UNITED STATES PATENTS 2,368,873    Pollard  _____ Feb. 2, 1945